(12) United States Patent
Kaga et al.

(10) Patent No.: US 6,545,733 B2
(45) Date of Patent: Apr. 8, 2003

(54) DISPLAY APPARATUS

(75) Inventors: Hiromitsu Kaga, Sagamihara (JP); Makoto Uehara, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/790,592

(22) Filed: Feb. 23, 2001

(65) Prior Publication Data

US 2001/0007485 A1 Jul. 12, 2001

Related U.S. Application Data

(62) Division of application No. 08/632,579, filed on Apr. 15, 1996, now Pat. No. 6,216,329.

(30) Foreign Application Priority Data

Apr. 18, 1995 (JP) .............................................. 7-092621

(51) Int. Cl.$^7$ .............................................. G02F 1/1333
(52) U.S. Cl. ............................................ 349/58; 349/60
(58) Field of Search .............................. 349/58, 59, 60; 361/681

(56) References Cited

U.S. PATENT DOCUMENTS

| | | | |
|---|---|---|---|
| 1,605,205 A | 11/1926 | Bellamy | 264/262 |
| 2,663,910 A | 12/1953 | Danielson et al. | 264/247 |
| 5,137,769 A | 8/1992 | Landi | 428/116 |
| 5,150,231 A | 9/1992 | Iwamoto et al. | 359/44 |
| 5,430,266 A | 7/1995 | Austin, Jr. et al. | 264/201 |
| 5,568,357 A | * 10/1996 | Kochis et al. | 361/681 |
| 5,659,376 A | 8/1997 | Kaga et al. | 29/458 |
| 5,710,607 A | * 1/1998 | Iwamoto et al. | 349/660 |
| 5,808,707 A | 9/1998 | Nibori et al. | 349/60 |

FOREIGN PATENT DOCUMENTS

JP    03-203773    9/1991

* cited by examiner

Primary Examiner—William L. Sikes
Assistant Examiner—Thoi V Duong
(74) Attorney, Agent, or Firm—Fitzpatrick, Cella, Harper & Scinto

(57) ABSTRACT

A display apparatus includes a display panel, a support means for supporting the display panel, and a housing for accommodating the display panel and the support means. The support means includes a first member to which the display panel is attached, a second member attached to the housing, and an elastic member disposed between the first and second members. The first and second members are integrally thermally bonded to each other via the elastic member through a process including a step of disposing the first member and the second member at prescribed positions within a mold, and an injection molding step of forming the elastic member between the first and second members by injection molding.

5 Claims, 4 Drawing Sheets

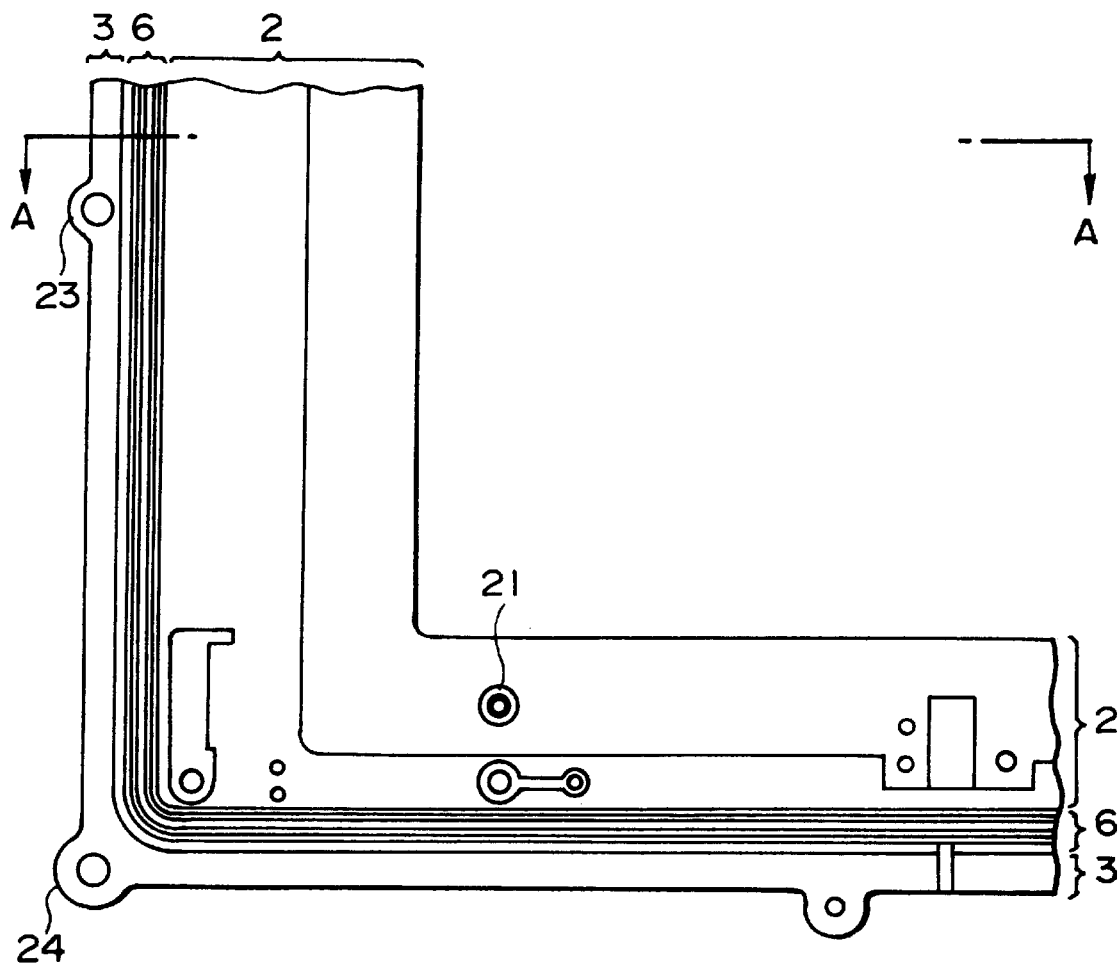
F I G. 2
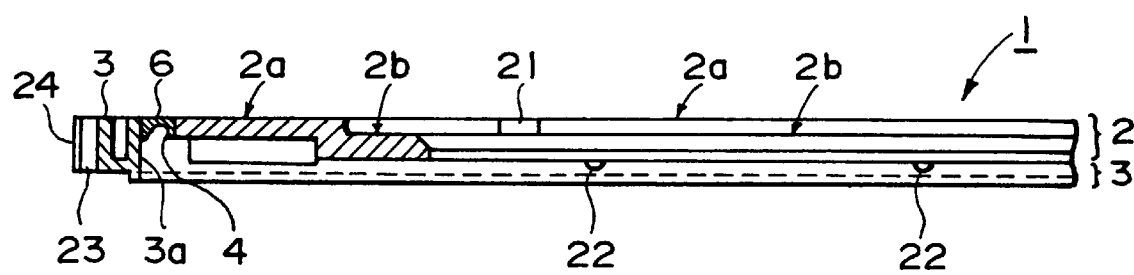
F I G. 3

DISPLAY APPARATUS

FIELD OF THE INVENTION AND RELATED ART

The present invention is a division of application Ser. No. 08/632,579, filed Apr. 15, 1996 now U.S. Pat. No. 6,216,329 and relates to a display apparatus for use in a television receiver, a computer display, etc., having an improved vibration resistance, and a process for producing such a display apparatus.

A display apparatus suitable for alleviating a vibration and an impact applied to a liquid crystal panel has been disclosed in Japanese Laid-Open Patent Application (JP-A) 3-203773. FIG. 5 shows an example of such a liquid crystal display apparatus having a vibration and impact-alleviating structure.

Referring to FIG. 5, the liquid crystal display apparatus includes a liquid crystal panel unit P, a backlight unit B, and apparatus housing members C1 and C2 for accommodating the liquid crystal panel unit P and the backlight unit B.

The liquid crystal panel unit P includes a fixing plate 2, a diffusion plate 59, a liquid crystal panel 10 and a peripheral circuit board 12. The fixing plate 2 is provided with an opening 2a. To a lower surface of a whole peripheral portion surrounding the opening 2a of the fixing plate 2, the diffusion plate 59 is affixed by screws (not shown) so as to close the opening 2a. The liquid crystal panel 10 is applied with a silicone adhesive applied onto an upper surface of the whole peripheral portion surrounding the opening 2a of the fixing plate 2 so as to close the opening 2a.

On the other hand, a fixing plate-support member 3 is disposed so as to surround the fixing plate 2. Thus, the fixing plate-support member 3 is shaped to have an opening 3a providing a prescribed gap between the member 3 and the fixing plate 2. The gap is filled with a silicone adhesive 6 as an elastic member so as to support the fixing plate 2 in an air hang or air suspension state by the support member 3 via the elastic member 6. More specifically, the adhesion with the elastic member 6 is performed by holding the fixing plate 2 within the opening 3a of the fixing plate-support member 3 to leave a gap and filling the gap with a silicone rubber-type adhesive, followed by curing of the adhesive.

The fixing plate-support member 3 is affixed to a frame member 68 having a sectional shape of roughly "L" and having an opening 68a, which is closed with a protective plate 11. The protective plate 11 is formed of a transparent and rigid glass plate. The frame member 68, the protective plate 11, the fixing plate-support member 3, the elastic member 6 and the liquid crystal panel unit P are disposed to define an almost closed space A2 in combination. When the liquid crystal panel unit supported in an air-suspension state with the elastic member 6 is supplied with an external impact or vibration, the vibration is suppressed by the air damper effect of the space A2, and the flexural deformation of the fixing plate 2 is minimized to minimize the flexural deformation of the liquid crystal panel 10, thus providing an improved impact resistance.

On the other hand, on a lower surface of the frame member 68, a sponge (elastic member) 61 is applied in a frame shape along a whole periphery of the opening 68a. Because of the elasticity of the sponge 61, the vibration of the liquid crystal panel 10 is also absorbed.

The frame member 68 is affixed to the upper housing member C1, to which the lower housing member C2 is detachably affixed to accommodate the liquid crystal panel unit P, etc.

Below the liquid crystal panel unit P, the backlight unit B is disposed by affixing it to the upper housing member C1 with screws 58. At a spacing between the backlight unit B and the lower housing C2, a panel control board (not shown) is disposed to convert signals from a computer (not shown) into a form suitable for liquid crystal drive and control the liquid crystal display apparatus.

Onto the backlight unit B, a sponge member 63 is applied in a frame shape so as to be abutted to the fixing plate 2. The fixing plate 2, the diffusion plate 59, the sponge 63 and the backlight unit B, in combination, form an almost closed space A1. Similarly as the space A2, the almost closed space A1 shows an air damper effect to suppress a vibration of the liquid crystal panel unit P supported in an air suspension state with the elastic member 6 caused by an external impact, thereby minimizing the flexural deformation of the liquid crystal panel 10 and providing an improved impact resistance. Because of the elasticity, the sponge 63 also has a function of absorbing the vibration of the liquid crystal panel 10.

The above-described display apparatus is accompanied with difficulties that the operation of filling the gap between the fixing plate 2 and the fixing plate-support member 3 with an appropriate amount of the silicone adhesive 6 and the curing of the adhesive takes almost a half day or longer, so that the productivity thereof is lowered to result in an increased production cost.

SUMMARY OF THE INVENTION

In view of the above-mentioned circumstances, a principal object of the present invention is to provide a display apparatus and a process for production thereof allowing a lower production cost.

According to the present invention, there is provided a display apparatus, comprising: a display panel, a support means for supporting the display panel, and a housing for accommodating the display panel and the support means, said support means including a first member to which the display panel is attached, a second member attached to the housing, and an elastic member disposed between the first and second members, wherein said first and second members are integrally thermally bonded to each other via the elastic member. Herein, it is preferred that the second member is provided with an opening, and the first member is disposed within the opening.

The elastic member may preferably comprise a thermoplastic elastomer and be formed to have a sectional shape like a character "U", "H", "N" or "M". It is also preferred to use a liquid crystal panel as a display panel and dispose the liquid crystal panel within the housing so as to support the liquid crystal panel by the housing via the elastic member.

According to the present invention, there is also provided a process for producing a display apparatus of the type described above, including a step of disposing the first member and the second member at prescribed positions within a mold, and an injection molding step of forming the elastic member between the first and second members by injection molding. In this case, the elastic member may preferably be formed by insert molding, or two- or multi-color molding.

According to the display apparatus as constituted above of the present invention, even when the second member is supplied with a vibration or impact, the transmission of the vibration or impact to the first member is suppressed because an elastic member is disposed between the first and second members.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a partial plan view of a liquid crystal panel-holding frame used in an embodiment.

FIG. 3 is a sectional view taken along a line A—A in FIG. 2.

DESCRIPTION OF THE PREFERRED EMBODIMENTS

Figure 1A:
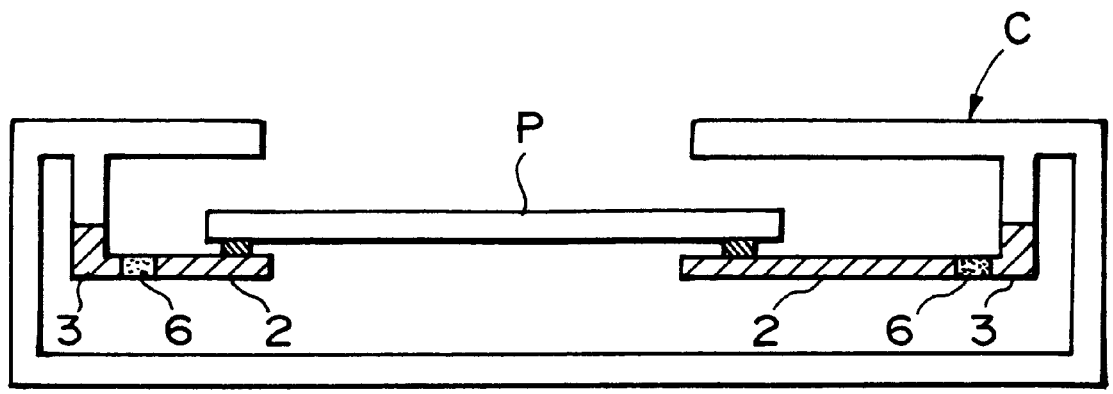
FIG. 1A is a sectional view of an embodiment of the display apparatus according to the invention.
Figure 1B:
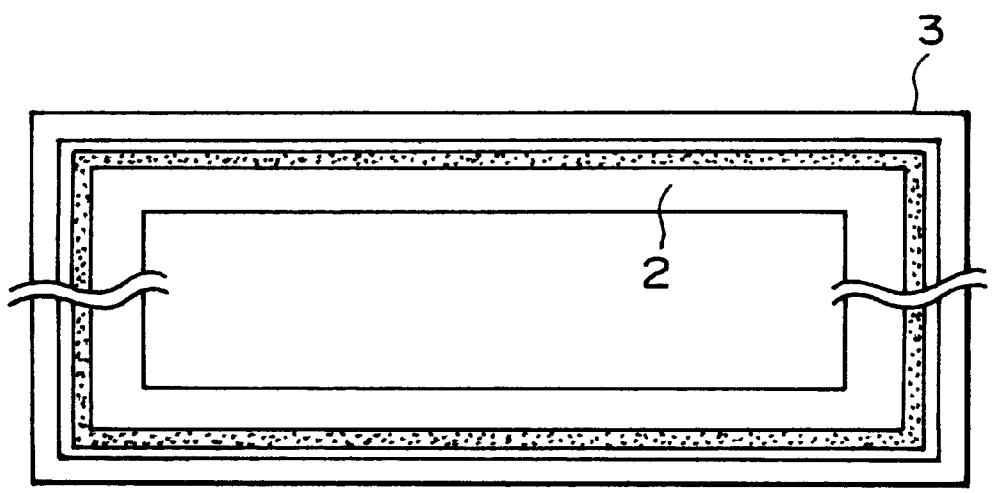
FIG. 1B is a plan view of a support means in the display apparatus.

FIG. 1A is a sectional view of a display apparatus according to a preferred embodiment of the present invention, and FIG. 1B is a plan view of a support means used therein.

The display apparatus includes a housing C composed of a metal, plastic, etc. and may be composed of a single member or an assembly of plural members. Within the housing C, a display panel P is disposed, which may be a liquid crystal display panel, an FED (field emission device), a plasma display panel, an electrochromic display panel, etc.

The display apparatus further includes a first support member 2 and a second support member 3 which constitute a support means and are attached to each other via an elastic member 6.

The first support member 2 is a panel-fixing plate and is in a frame shape surrounding an opening, in which the display panel P is disposed in position and attached to the first member 2 with an adhesive, etc.

Other members, such as a backlight and a protective glass sheet, are omitted from showing in FIG. 1A.

In the present invention, the first and second members 2 and 3 are thermally bonded integrally to each other.

Next, the structure of a specific support means will be described.

FIG. 2 is a plan view of a liquid crystal panel-holding frame according to the present invention, and FIG. 3 is a sectional view taken along a line A—A in FIG. 2. In FIG. 3, a hatched portion represents a section. The liquid crystal panel-holding frame 1 includes a panel-fixing plate 2 to which a liquid crystal panel is attached, a support member 3 for supporting the panel-fixing plate 2 and an elastic member 6 for bonding an outer end face 4 of the panel-fixing plate 2 and an inner end face 3a of the support member 3. The fixing plate 2 has a front surface 2a, a surface for attachment of a display panel, and bosses 21 and 22. The support member 3 is provided with perforations 23 and 24 for attachment.

The panel-fixing plate 2 and the support member 3 are composed of a resin, and they are integrally thermally bonded to each other via the elastic member 6 comprising a thermoplastic elastomer by insert molding, two-color molding or multi-color molding.

The panel-fixing plate 2 and the support member 3 may for example comprise polycarbonate or ABS (acrylonitrile-butadiene-styrene copolymer) resin.

Examples of the thermoplastic elastomer constituting the elastic member 6 may for example comprise polyolefine-based elastomer, silicone-based elastomer, polystyrene-based elastomer, and polyester, based elastomer. The thermoplastic elastomer after the curing may desirably have a hardness (JIS-A rubber hardness) of 10–90 deg. so as to exhibit an appropriate elasticity.

In a specific example, the panel-fixing plate 2 and the support member 3 comprised polycarbonate, and the elastic member 6 comprised a mixture of polyolefine-based elastomer and silicone-based elastomer so as to provide a hardness of 40 deg. A lower hardness may be attained by using a larger proportion of silicone-based elastomer but the resultant elastomer can fail to be melt-bonded to the polycarbonate resin member and can cause a separation at the boundary between the resin member and the elastomer after the molding.

The elastic member 6 is formed into a shape (sectional shape of "U") having a thin wall portion so as to easily follow a deformation under load. Particularly, in case where an elastomer having a hardness equivalent to the conventional silicone resin but liable to show an insufficient adhesion strength with the resin member is used, the elastomer may desirably be shaped to have a particularly thin wall partition as in this embodiment to have a similar hardness as the silicone adhesive without using an elastomer of a lower hardness.

Similar effects may be attained when the elastic member 6 is formed to have a thin wall portion providing a sectional shape of "H", "N" or "M" instead of "U" as shown in FIG. 3.

Figure 4:
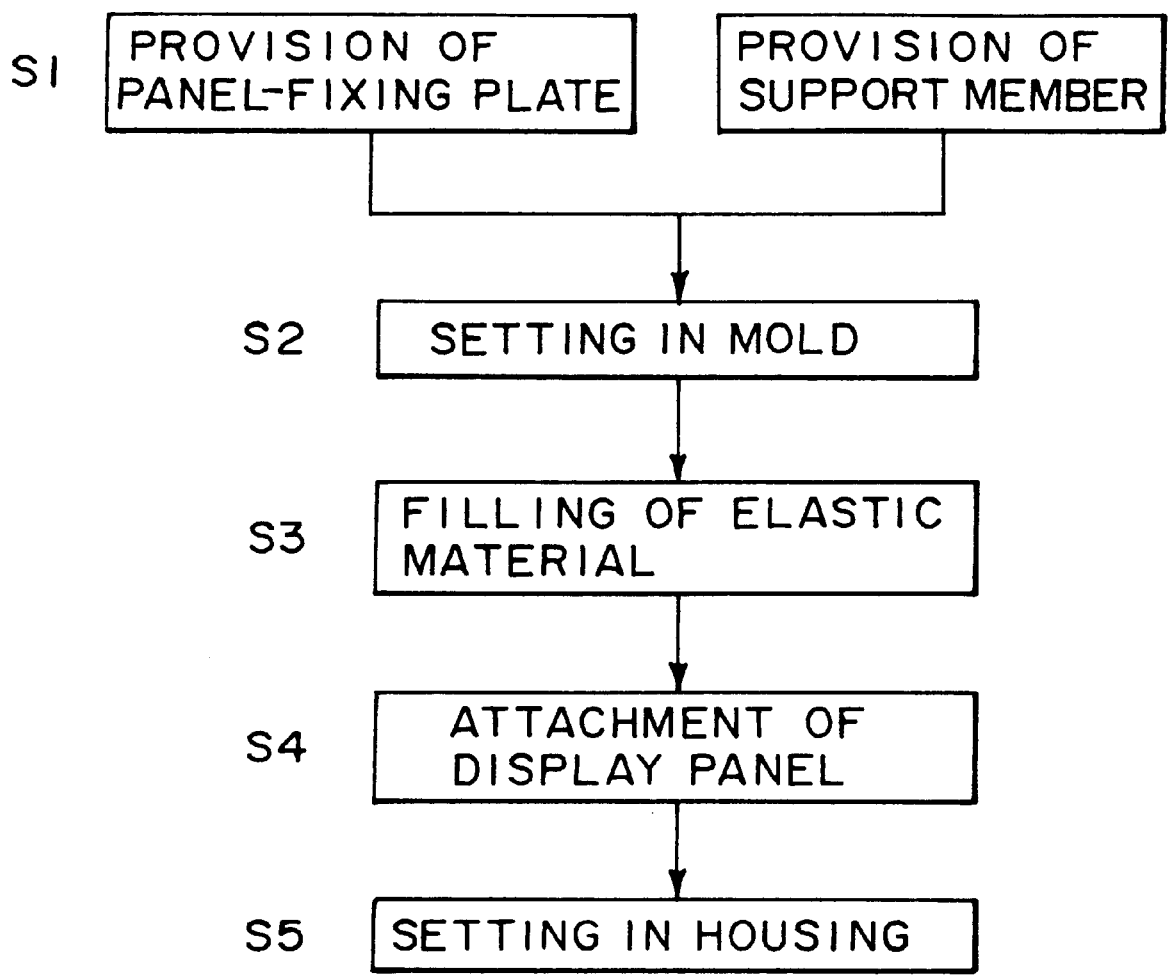
FIG. 4 is a flow chart showing steps for production of a display apparatus according to the invention.
Figure 5:
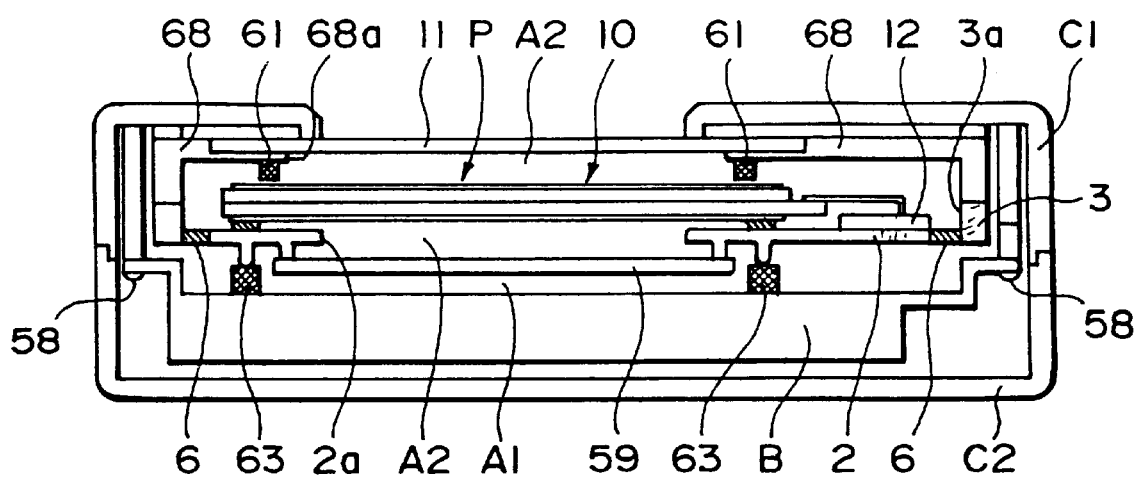
FIG. 5 is a sectional view showing a structure of a known liquid crystal display apparatus.

Next, an embodiment of process for producing a liquid crystal panel-holding frame according to the present invention will now be described with reference to FIG. 4. In order to thermally bond the panel-fixing plate 2 and the support member 3 by the elastic member 6, the panel-fixing plate 2 and the support member 3 are molded in advance (S1). Then, these members are set within a mold (S2). In this instance, a gap or space in a shape of the elastic member 6 is left between the end face of the panel-fixing plate and the inner end face of the support member 3. Then, the gap or space is filled with the above-mentioned thermoplastic elastomer by injection under a pressure to form an elastic member at the gap, thus thermally bonding the panel-fixing plate 2 and the elastic member 6 and also the elastic member 6 and the support member 3.

Thereafter, a display panel is attached to the fixing plate 2 (S4) and the support member 3 is attached to the housing (S5), followed by necessary wiring to complete a display apparatus.

According to the production process, the bonding between the panel fixing plate 2 and the support member 3 may be completed within 10 min. as a time required for injection molding of the thermoplastic elastomer, whereby a remarkable shortening of time can be accomplished compared with a time (about a half day) required for filling and curing of silicone adhesive.

Instead of the insert molding described above, it is also possible to effect an injection molding by using a two-color or multi-color molding using a rotary or slidable mold. In this case, the panel fixing plate and the support member may be molded in a first step, and then the elastic member may be molded in a second step, whereby the setting of the panel-fixing plate and the support member prepared in advance in a mold can be omitted to further simplify the production steps.

After a liquid crystal panel is attached to the liquid crystal panel-holding frame prepared through the above-mentioned steps, during further steps for setting within the liquid crystal display apparatus, the liquid crystal panel affixed to the panel-fixing plate is supported in an air suspension state via the elastic member, so that the flexural deformation of the fixing plate is reduced to a very low level even when supplied with a vibration or impact, and therefore the flexural deformation of the liquid crystal panel is also suppressed to show an improved impact resistance.

The material combination between the panel-fixing plate and the elastic member described above is just an example, and other combinations can be used if they allow a thermal bonding therebetween.

Next, the effect of the present invention will be described.

According to the present invention, as the elastic member 6 is disposed between the fixing plate 2 and the support member 3, the transmission of a vibration or impact from the support member 3 to the fixing plate 2 can be suppressed to provide improved vibration resistance and impact resistance. Further, as almost closed spaces A1 and A2 are formed below and above the liquid crystal panel 10, the flexural deformation of the liquid crystal panel 10 under application of a vibration or impact can be alleviated due to their air damper effect, thereby providing improved vibration resistance and impact resistance of the liquid crystal panel 10.

On the other hand, as the fixing plate 2 and the support member 3 are thermally bonded to each other, the bonding can be completed in a shorter period, thereby allowing a shorter production period and a lower production cost.

In a specific embodiment, an elastic member 6 showing a hardness of 40 deg. is used in combination with a panel-fixing plate 2 and a support member 3 comprising polycarbonate, whereby a sufficient bonding strength is attained between the panel-fixing plate 2 and the elastic member 6 and also between the elastic member 6 and the support member 3.

Because of a thin wall portion providing a sectional shape of "U", etc., the elastic member 6 can ensure a sufficient elasticity following a deformation under a load, so that the transmission of a vibration or impact from the support member 3 to the fixing plate 2 is suppressed to provide improved vibration resistance and impact resistance of the liquid crystal panel 10.

Further, as the integral assemblage of the panel-fixing plate 2, the support member 3 and the elastic member 6 is performed in an injection mold by the insert molding, two-color molding or multi-color molding, the production cost can be reduced. Particularly, in the case of the two-color or multi-color molding, the panel-fixing plate 2 and the support member 3 are also formed in a single mold, so that the production steps can be further simplified.

As described above, in the present invention, an elastic member is disposed between the first member and the second member, so that the transmission of a vibration or impact from the second member to the first member is suppressed to provide an improved impact resistance and vibration resistance of a display panel, such as a liquid crystal panel.

Further, as the first member and the second member are thermally bonded, the bonding can be completed in a short period to allow a shortening of production period and a reduction of production cost.

Further, by forming the elastic member with a thin wall portion, it is possible to ensure an elasticity, i.e., deformation followability under load, thereby suppressing the transmission of a vibration etc., from the second member to the first member to improve the vibration resistance and impact resistance of a display panel, such as a liquid crystal panel.

Further, by forming the elastic member by the insert molding, the two-color molding or the multi-color molding, the first and second members can be formed in a single mold to further simplify the production steps.

Further, by forming the elastic member with a thermoplastic elastomer, the elasticity of the elastic member is better exhibited to provide a further improved vibration resistance and impact resistance of a display panel, such as a liquid crystal panel.

What is claimed is:

1. A display apparatus comprising:

a display panel, a support means for supporting the display panel, and a housing for accommodating the display panel and the support means, wherein said support means includes a frame-shaped first resin member to which a back side of the display panel is attached and fixed, a frame-shaped second resin member disposed outside the first resin member and attached to the housing, and an elastic member having a U-shaped section so as to form an open groove and disposed between the first and second resin members, and wherein said first and second resin members are integrally thermally molded and bonded to each other via the elastic member.

2. The display apparatus according to claim 1, wherein said second member is provided with an opening in which the first member is disposed.

3. The display apparatus according to claim 1, wherein said elastic member comprises a thermoplastic elastomer.

4. The display apparatus according to claim 1, wherein said elastic member is formed with a thin wall portion.

5. The display apparatus according to claim 1, wherein said display panel is a liquid crystal panel.

* * * * *